US011790414B2

(12) United States Patent
Christensen et al.

(10) Patent No.: US 11,790,414 B2
(45) Date of Patent: *Oct. 17, 2023

(54) TECHNIQUES AND ARCHITECTURES FOR CUSTOMIZABLE MODULAR LINE ITEM EVALUATION

(71) Applicant: Salesforce, Inc., San Francisco, CA (US)

(72) Inventors: Mitchell Christensen, Livermore, CA (US); Parth Vijay Vaishnav, Newark, CA (US); David Clark, South San Francisco, CA (US); Wei Gao, Sunnyvale, CA (US)

(73) Assignee: Salesforce, Inc., San Francisco, CA (US)

( * ) Notice: Subject to any disclaimer, the term of this patent is extended or adjusted under 35 U.S.C. 154(b) by 477 days.

This patent is subject to a terminal disclaimer.

(21) Appl. No.: 16/779,340

(22) Filed: Jan. 31, 2020

(65) Prior Publication Data

US 2021/0241328 A1 Aug. 5, 2021

(51) Int. Cl.
*G06Q 30/00* (2023.01)
*G06Q 30/0283* (2023.01)
(Continued)

(52) U.S. Cl.
CPC .......... *G06Q 30/0283* (2013.01); *G06F 9/54* (2013.01); *G06Q 30/0611* (2013.01)

(58) Field of Classification Search
CPC ... G06Q 30/0283; G06Q 30/0611; G06F 9/54
(Continued)

(56) References Cited

U.S. PATENT DOCUMENTS 5,577,188 A 11/1996 Zhu
5,608,872 A 3/1997 Schwartz et al.
(Continued)

FOREIGN PATENT DOCUMENTS

CA 2285190 10/1998
WO 0135293 A1 5/2001
(Continued)

OTHER PUBLICATIONS

"Plug-in Architectures"; Dec. 16, 2013; developer.apple.com; 6 pages. (Year: 2013).*
(Continued)

*Primary Examiner* — Anand Loharikar
(74) *Attorney, Agent, or Firm* — Kwan & Olynick LLP

(57) ABSTRACT

Pluggable pricing modules with functional extension points. A plurality of pricing methods are installed with a pricing service. The pricing service has a pluggable architecture to accept pricing methods including a set of pricing functions, and one or more extension points that provide programmatic hooks within an operational flow of the pricing service to provide optional interfaces to functional modules external to the pricing service. In response to a pricing request for a sales transaction, the pricing request including a pricing resolving selected pricing method for each sales item of the one or more sales items from the plurality of pricing methods. At least one of the one or more extension points are used to call an external functional module to interact with the operational flow of the pricing service. Aggregated results are provided to the source of the pricing request.

20 Claims, 13 Drawing Sheets

(51) Int. Cl.
*G06F 9/54* (2006.01)
*G06Q 30/0601* (2023.01)

(58) Field of Classification Search
USPC .............................................. 705/26.1–27.2
See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,078,854 A | 6/2000 | Breed |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,584,155 B1 | 9/2009 | Carter, III et al. |
| 7,620,655 B2 | 11/2009 | Larsson et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0267674 A1* | 12/2004 | Feng ............... G06Q 30/0278 705/306 |
| 2004/0268299 A1 | 12/2004 | Lei et al. |
| 2005/0050555 A1 | 3/2005 | Exley et al. |
| 2005/0066058 A1* | 3/2005 | An ................ H04L 67/565 709/246 |
| 2005/0091098 A1 | 4/2005 | Brodersen et al. |
| 2008/0255973 A1 | 10/2008 | Wade et al. |
| 2008/0275758 A1 | 11/2008 | Clayton |
| 2008/0312994 A1 | 12/2008 | Clayton |
| 2009/0177744 A1 | 7/2009 | Marlow et al. |
| 2009/0248429 A1 | 10/2009 | Doenig |
| 2010/0223104 A1 | 9/2010 | Patel et al. |
| 2012/0078815 A1 | 3/2012 | Rossi |
| 2013/0304571 A1 | 11/2013 | Swinson |
| 2014/0067479 A1 | 3/2014 | Stacklin |
| 2014/0108093 A1 | 4/2014 | Yu |
| 2015/0012467 A1 | 1/2015 | Greystoke |
| 2018/0330324 A1 | 11/2018 | Mccandless |
| 2019/0080394 A1 | 3/2019 | Wang |
| 2019/0122270 A1 | 4/2019 | Sustik |
| 2019/0266626 A1 | 8/2019 | Khosla |
| 2020/0089515 A1 | 3/2020 | Hari |
| 2020/0160242 A1 | 5/2020 | Johnson |

FOREIGN PATENT DOCUMENTS

| | | |
|---|---|---|
| WO | 2008115989 A2 | 9/2008 |
| WO | 2021149075 A1 | 7/2021 |

(56) References Cited

FOREIGN PATENT DOCUMENTS

OTHER PUBLICATIONS

Non-Final Office Action for U.S. Appl. No. 16/779,378 dated Jul. 9, 2021, 26 pages.
U.S. Appl. No. 16/779,373, filed Jan. 31, 2020.
U.S. Appl. No. 16/779,378, filed Jan. 31, 2020.
U.S. Appl. No. 16/779,381, filed Jan. 31, 2020.
U.S. Appl. No. 16/779,383, filed Jan. 31, 2020.
U.S. Appl. No. 16/910,436, filed Jun. 24, 2020.
API, wikipedia, archives org webpages, Jun. 24, 2020 https://web.archive.org/web/20200624204020/https://en.wikipedia.org/wiki/Application_programming_interface (Year: 2020).
Dewan et al, Adoption of Internet-Based Product Customization and Pricing Strategies. Journal of Management Information Systems. Aug. 30, 2000 17-29-28 https://dl.acm.org/doi/abs/10.5555/1289629.1289632 (Year: 2000).
Non-Final Office Action for U.S. Appl. No. 16/910,436 dated Sep. 8, 2021, 31 pages.
Office Action (Non-Final Rejection) dated Feb. 24, 2022 for U.S. Appl. No. 16/779,383 (pp. 1-27).
Obermiller et al. Customized Pricing: Win Win or End Run? Apr. 2012; Drake Management Review, vol. 1, Issue 2, 17 pages (Year: 2012).
Office Action (Non-Final Rejection) dated Jun. 24, 2022 for U.S. Appl. No. 16/779,373 (pp. 1-19).
Office Action (Final Rejection) dated Dec. 15, 2022 for U.S. Appl. No. 16/779,373 (pp. 1-16).

* cited by examiner

TECHNIQUES AND ARCHITECTURES FOR CUSTOMIZABLE MODULAR LINE ITEM EVALUATION

TECHNICAL FIELD

Embodiments relate to techniques for providing and maintaining a customizable modular evaluation architecture. More particularly, embodiments relate to techniques and architectures for an evaluation engine that can function as a pluggable framework that enables incremental development of internal and external evaluation (e.g., pricing) modules.

BACKGROUND

In business operations, the generation of pricing is often a computationally intensive task. Each sales item of a large sales order or other pricing transaction may require a different pricing method, with each method requiring numerous processes.

In providing support for client pricing operations, a central pricing engine architecture can provide efficient and effective pricing operations for multiple clients without requiring the support of an internal pricing structure for each such client, thereby greatly benefiting client operations.

However, establishing or modifying the pricing for a particular client can require significant programming overhead for a pricing engine. A conventional pricing platform incorporates the pricing algorithm utilized to generate pricing within the pricing engine itself. As a result, the pricing platform needs to be programmed with each client's pricing operation, and needs to be modified when a pricing algorithm is added or modified for the client.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Figure 1:
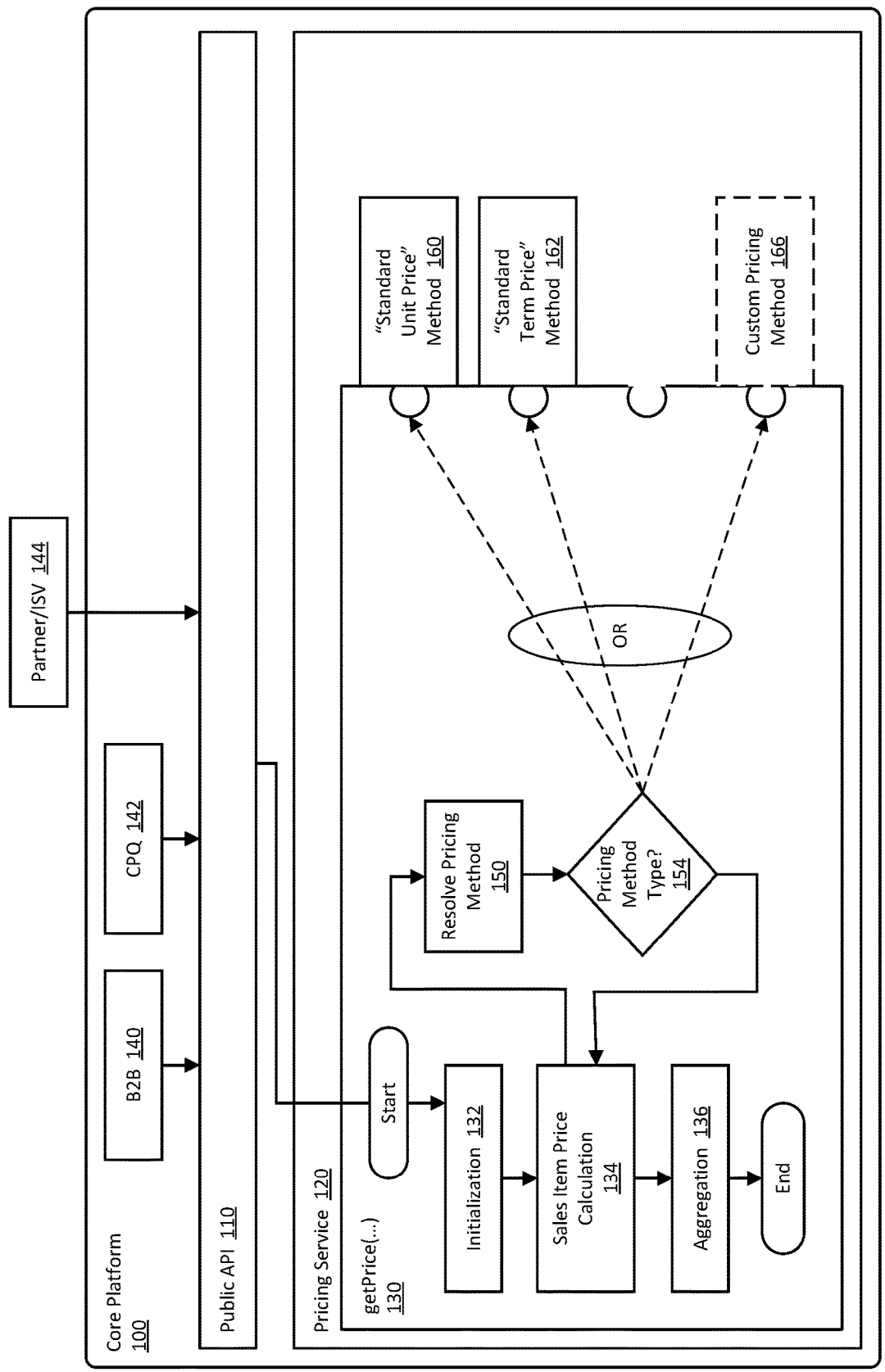
FIG. 1 is an illustration of one embodiment of a computing platform including a pluggable pricing architecture.

In the following description, numerous specific details are set forth. However, embodiments may be practiced without these specific details. In other instances, well-known circuits, structures and techniques have not been shown in detail in order not to obscure the understanding of this description.

In some embodiments, an apparatus, system, or process is to provide for a pluggable architecture for performance of pricing operations. In contrast with a conventional pricing framework that incorporates a pricing algorithm for a client's pricing operation within the pricing engine (which may also be referred to herein as the host pricing engine or similar term), and thus must be modified when a pricing algorithm is added or modified, a pricing platform is implemented as a pluggable framework that enables incremental development of both internal pricing constructs as well as custom pricing constructs defined by partners, independent software vendors (ISVs), or customers (which may generally be referred to herein as clients). Pricing logic (referred to as a pricing method) is implemented as a plugin to the pricing engine that can be selected by the client.

In some embodiments, a host pricing engine has no knowledge regarding the pricing constructs that define the various pricing algorithms, allowing clients to define their own pricing constructs to suit their specific business needs without requiring modification of the pricing engine.

Further, the pricing framework both includes plugins for common use cases to be supported for multiple or all clients of the pricing engine (e.g., Standard Unit Price, Standard Term Price, or other standard pricing methods), and also allows customization of such standard plugins to enable certain clients, such as large enterprises, industry partners, and customers with special requirements to make modifications to the pricing methods as needed. Each pricing method includes one or more standard and/or custom pricing functions that can be modified or replaced. A custom pricing function may, for example, allow access to external proprietary data or processes. As used herein, "standard" refers to a method or function can be made available to multiple or all clients of a pricing system, while "custom" refers to a method or function that is generated for a particular client, and may, for example, utilize proprietary data or operations.

In some embodiments, a pricing platform includes the pluggable pricing engine supporting a pricing service. In this architecture, a pricing method defines the pricing for a particular sales item, with the pricing method plugging into the pricing platform. Each pricing method includes one or more pricing functions that define each operation that is performed in the pricing method. In some embodiments, a pre-defined set of extension points are exposed in the host pricing architecture, the extension points allowing customization of the basic flow of the pricing engine itself. These extension points can be considered programmatic hooks that function as optional exit and entry points in the pricing architecture that can be utilized to interface with one or more external modules that can provide functionality to the pricing engine.

Prior to any price calculations for a pricing request, the pricing engine is to validate the input parameters for the request, and has the option of pre-loading (for example, using cache storage) and validating any required pricing related data (which may include Product and PricebookEntry data, discount schedules, and other data.) In the price calculation for each sales item, each sales item is processed by first determining the appropriate pricing method from, such a determination based on the associated Product or PricebookEntry data or other similar data. Further, a context for calculating the sales item price is prepared and the appropriate pricing method (i.e., the pricing method plugin, such as illustrated in FIGS. 1 and 2) is invoked, with the pricing method being passed with the sales item context.

In some embodiments, pricing methods for a pricing engine are implemented as plugins to the pricing engine. As used herein, pricing method is comprised of an ordered set of pricing functions that define the calculation of pricing for a sales item. A pricing function is a cohesive logical pricing operation that defines a single process within a pricing method. Once the sales items in a particular pricing request have been priced according to the respective pricing method for each such sales item, aggregate pricing may then be performed, with aggregate pricing including summarizing totals at a header level, etc., to complete the full pricing operation for the pricing request. The pricing results may then be reported to the appropriate client.

As used herein, "sales transaction" refers to any sales order or inquiry for one or more sales items, with each sales item including a certain quantity; "pricing plan" refers to calculations performed to generate pricing for the one or more sales item in a sales transaction; and "pricing flow" refers to the context for a particular pricing request.

Figure 2:
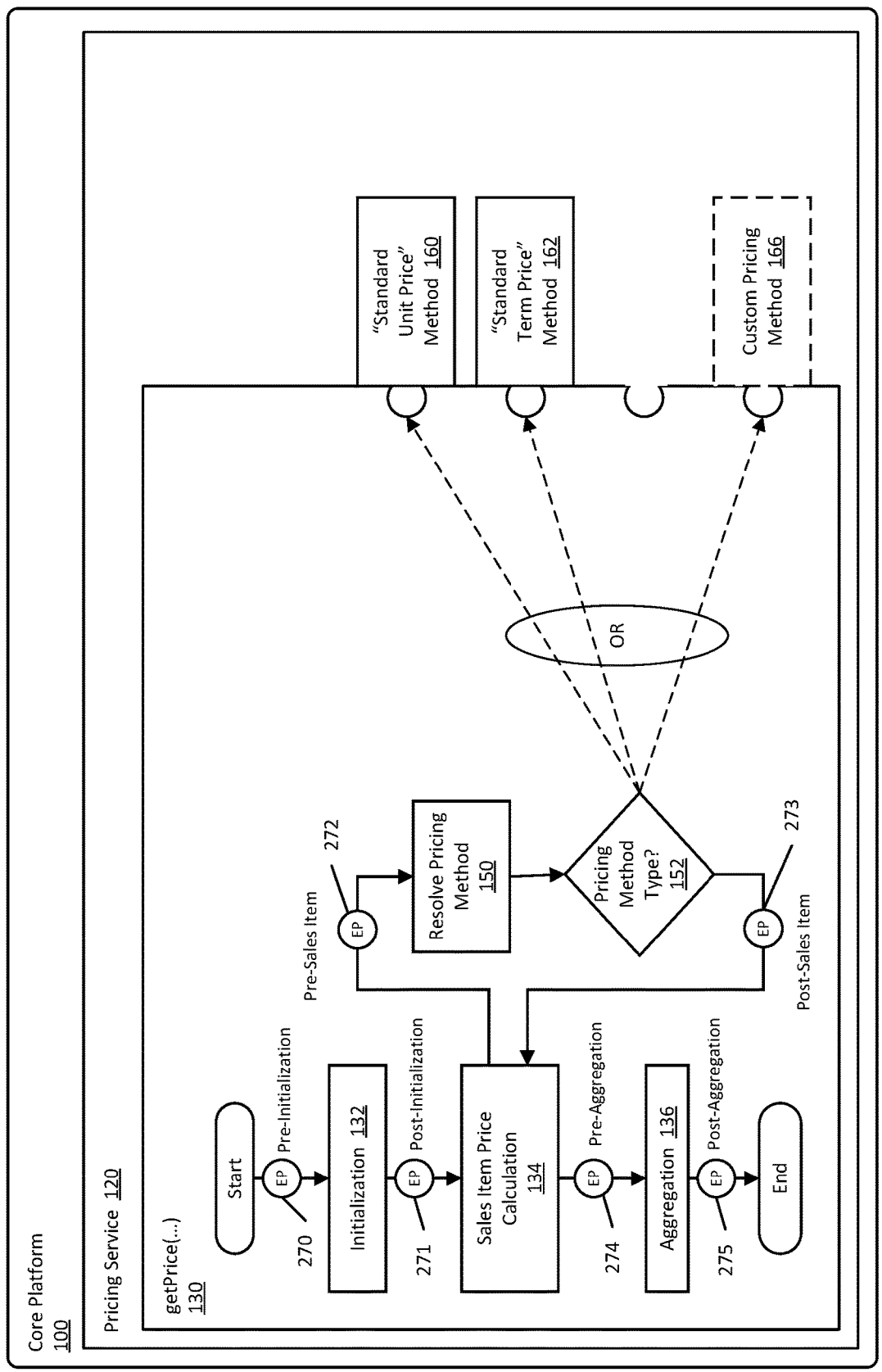
FIG. 2 is an illustration of one embodiment of a computing platform including extension points for a pluggable pricing architecture.

FIG. 1 is an illustration of one embodiment of a computing platform including a pluggable pricing architecture. As illustrated, a core computing platform 100 may provide multiple services including, but not limited to, a pricing service 120 (the host pricing service) to provide pricing operations for multiple different types of sales operations for multiple clients. The core platform 100 may include numerous other operations and functions that are not described herein. Core platform 100 can be, for example, a client environment provided by salesforce.com, inc. of San Francisco, Calif.

The core platform 100 may include a public application program interface (API) 110 for connection of multiple different types of clients that may generate operation requests, including requests to the pricing service 120. The pricing requests may include business to business (B2B) requests 140 and configure-price-quote (CPQ) requests 142 provided within the core platform 100, and partner or independent software vendor (ISV) requests 144 received from outside the core platform 100. Other types of pricing requests may also be received.

The pricing service 120 in particular includes a getPrice function 130 to determine pricing for one or more sales items in a sales transaction, the sales items being any combination of goods and services. In a basic operation, the getPrice function for a particular request includes initialization of the pricing operation 132, sales price calculation for each sales item of the request 134, and aggregation of the pricing calculations to generate a pricing output 136 to be provided to the client. In some embodiments, the sale item price calculation 134 includes resolving a pricing method for a sales item 150, wherein each sales item may utilize a different pricing method, and selecting and running the appropriate pricing method 154 for the sales item.

In some embodiments, the pricing architecture is a pluggable architecture in which multiple different pricing methods may be plugged for use in one or more sale transactions. The pricing method for a sales item may include a pricing method of one or more standard pricing methods provided by the pricing service, or a particular custom pricing method of one or more custom pricing methods for the client. In a particular example, the pricing methods available at particular point in time for a client utilizing the pricing service 120 are a Standard Unit Price method 160, a Standard Term Price method 162, or a custom pricing method 166. In some embodiments, the standard pricing methods 160 and 162 are available to multiple or all clients of the pricing service, and the custom pricing method 166 is available only to a particular client, wherein the custom pricing method 166 may include confidential and exclusive features established by or for the client. Any number of pricing methods may be available in a particular implementation. In some embodiments, pricing methods are plugged into the pricing service 120 without requiring modification or reprogramming of the pricing service 120, and such pricing methods may be replaced by other or different pricing methods as required for all clients or any particular client or clients.

FIG. 2 is an illustration of one embodiment of a computing platform including extension points for a pluggable pricing architecture. As illustrated, the core computing platform 100 includes pricing service 120, with the pricing service 120 including the getPrice function 130.

In various embodiments, in addition to adding/modifying pricing methods, functions and/or flows, the pricing engine can expose the pre-defined set of extension points illustrated in FIG. 2. Each extension point can allow for customization of the basic flow of the pricing engine. A customization to the pricing engine can thus be referred to as a pricing engine extension. The pricing engine can define a set of extension points (e.g., as illustrated in FIG. 2) within the main processing flow, and provide (in some embodiments) both a JAVA and an APEX interface for each pricing engine extension point. Each pricing engine extension is then associated with a specific extension point in the price processing flow.

In various embodiments, extension points can provide a mechanism for external parties (e.g., partner/ISV 144 or B2B 140 of FIG. 1) to augment the functionality of pricing service 120. For example, a consumer of pricing service 120 (i.e., the person/party providing the customization) may wish to use the functionality provided by pricing service 120 and provide additional custom functionality. The extension points allow the consumer to apply custom logic/functionality before or after various stages of the getPrice function 130 flow.

As an example use case, a vendor may want to ensure that the discounted price for a given product never falls below the cost of producing that product. In this use case the vendor could implement a Post-Sales Item (e.g., 273) extension that could, for example, look up the cost of the product being prices and make sure that the discounted unit price does not fall below that cost. If the discounted nit prices is equal to or greater than the cost price for the product, the extension point could return and the pricing process can continue. If the discounted unit price falls below the required minimum price, a pricing exception could be handled by vender-provided code (e.g., the pricing process could be completely halted by throwing an exception, or the line item could be marked as invalid). Additional example use cases and configurations are described in greater detail below.

The getPrice function 130 for a particular request again includes initialization of the pricing operation 132, sales price calculation for each sales item of the request 134, and aggregation of the pricing calculations to generate a pricing output 136, and the sale item price calculation 134 including resolving a pricing method for each sales item 150 and selecting and running the appropriate pricing method for the sales item 154. The pricing methods are again illustrated as a Standard Unit Price method 160, a Standard Term Price method 162, and a custom pricing method 166, but may include any number of standard and custom pricing methods in a particular implementation.

In some embodiments, an architecture of the pricing service 120 includes one or more defined extension points (EPs) to enable plugging in one or more additional or substitute elements in the pricing service 120 without requiring reprogramming or modification of the pricing service 120, thus allowing for efficient modification of the pricing operation as required for any particular client.

As illustrated in FIG. 2, a particular example includes one or more of a pre-initialization EP 270 prior to initialization 132; a post-initialization EP 271 after initialization 132 and before sales price calculation 134; a pre-sales item EP 272 prior to resolving the pricing method 150; a post-sales item EP 273 after selecting the pricing method type 152; a pre-aggregation EP 274 prior to aggregation of pricing results 136; and a post-aggregation EP 275 after aggregation of pricing results 136. In this manner, customization may be implemented as required within the pricing method 130 to accomplish a needed result for pricing for a particular client.

Particular examples of pricing methods, such as pricing methods 160, 162, and 166, for utilization in a pricing service are illustrated in FIGS. 1 and 2. Each such pricing method defines a specific algorithm that can be modified, deleted or replaced for calculating the price of a given product in the context of a sales transaction. Each sales item within a sales transaction may be associated with exactly one pricing method and different items within a "basket" or "shopping cart" can be associated with different pricing methods (or a single pricing method can be applied to all items). In some embodiments, each pricing method is defined as metadata that specifies a set of pricing functions required for price generation, the execution order of such pricing functions, and the set of pricing flows to which each pricing function applies. Pricing functions and flows are further illustrated in FIGS. 4 and 5.

In some embodiments, unlike pricing methods, pricing functions that make up the pricing methods are defined in code. The pricing functions may be written in, for example, either Java or Apex. The standard pricing functions may be developed for the host system, and additional custom pricing functions can be written by customers, partners or ISVs. In a particular implementation, the standard pricing functions are written in a first format, such as Java, and the custom pricing functions are written in a second format, such as Apex. However, other implementations are possible, such as a custom pricing function could be defined using Salesforce Flow by defining the function using Salesforce Cloud Flow Designer.

Figure 3:
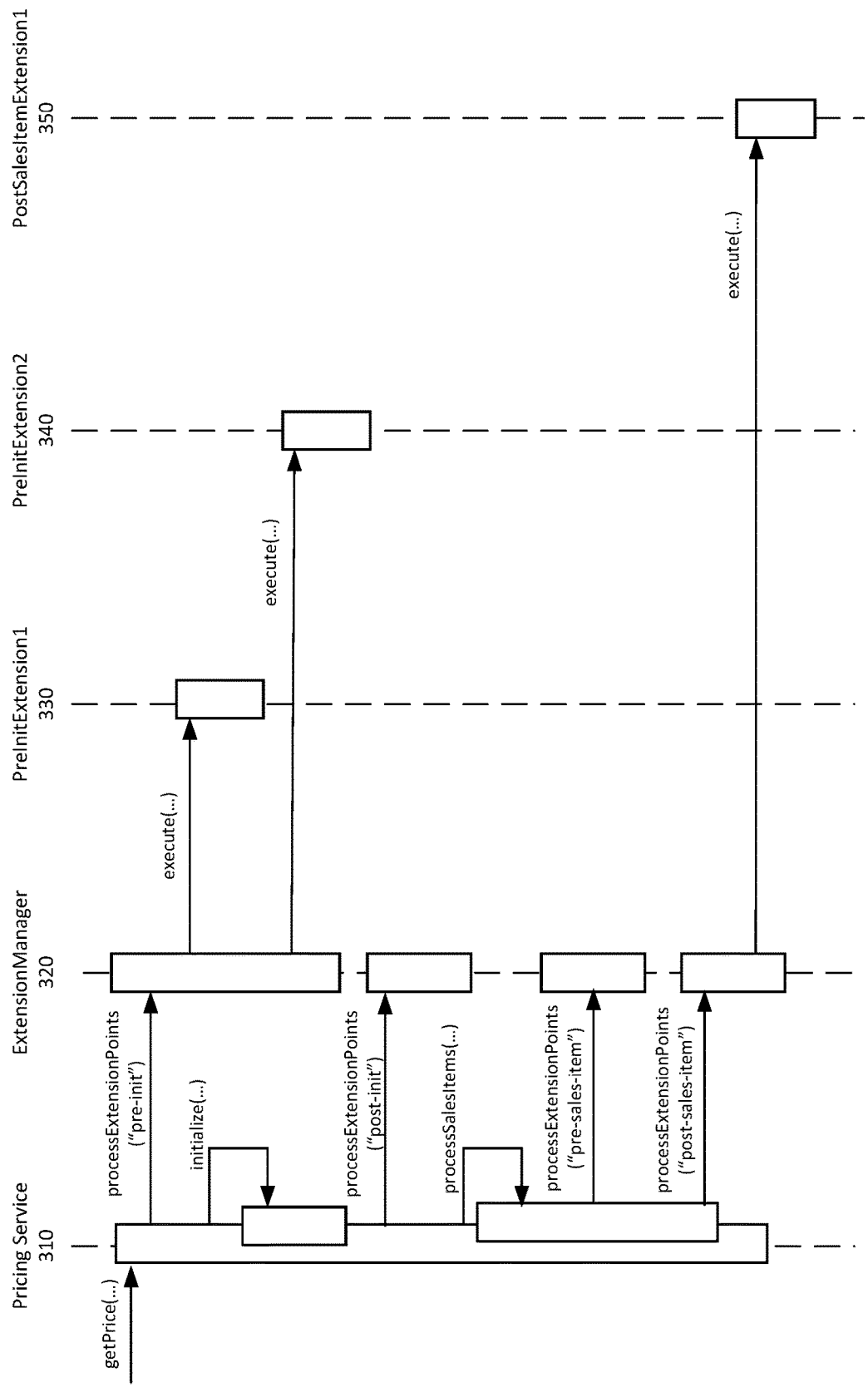
FIG. 3 is an illustration of one embodiment of operation utilizing extensions in a pluggable pricing architecture.

FIG. 3 is an illustration of one embodiment of operation utilizing extensions in a pluggable pricing architecture. In a pricing architecture including extension points, such as illustrated in FIG. 2, at any of the available extension points, a customer, partner, or ISV can add custom extensions by associating an Apex class, invocable action, or Flow that defines the custom extension with the extension point name.

One or more extensions may be applied to each extension point. In a particular example, a set of extension points may include, but is not limited to, the following extension points (as illustrated in FIG. 2):
(1) Pre-initialization
(2) Post-initialization
(3) <<for each sales item>>
   (a) Pre-sales item processing
   (b) Post-sales item processing
(4) Pre-aggregation
(5) Post-aggregation FIG. 3 illustrates operations of a Pricing Service 310 and Extension Manager 320. The interaction diagram fragment illustrates how extensions may be called during processing of a sales transaction. In this particular example, three extensions have been applied to the core processing flow. Two extensions have been applied to the pre-initialization extension point (PreInitExtension1 330 and PreInitExtension2 340), and one extension has been applied to the post-sales-item extension point (PostSalesItemExtension1 350). In this example, the PostSalesItemExtension1 350 will be executed after the price calculation is complete for each sales item, allowing the extension to inspect/modify the results of the price calculation. In this example, the following processes are performed:

Call getPrice( . . . ) to the Pricing Service 310 for a particular sales transaction
   Pricing Service 310 processExtensionPoints (pre-initialization) call to the Extension Manager 320, resulting in execution by PreInitExtension1 330 and PreInitExtension2 340
   Initialization by the Pricing Service 310
   Pricing Service 310 processExtensionPoints (post-initialization) call to the Extension Manager 320, which are not applied to the processing flow
   Pricing Service 310 performs processSalesItems
   Pricing Service 310 processExtensionPoints (pre-sales-item) call to the Extension Manager 320, which are not applied to the processing flow
   Pricing Service 310 processExtensionPoints (post-sales-item) call to the Extension Manager 320, resulting in execution by PostSalesItemExtension1 350

In some embodiments, each extension can determine whether subsequent extensions associated with the current extension point should be executed. Further, each extension may also determine the next extension point (by name) in the basic pricing engine flow to execute (similar to a 'goto' type of operation).

For example, by specifying that no additional extensions for the current extension point be executed, any extension can short circuit the flow of extensions associated with a given extension point. By specifying the next extension point to be executed, any extension point can bypass basic pricing engine logic. For example, if an extension associated with the Post-initialization extension point specifies the next extension point to be executed as Pre-aggregation, that extension has in effect bypassed the default processing of the sales items. A use case for this feature may include a customer that wishes to leverage the validation logic in the initialization stage and apply standard aggregation functions but chooses to price each sales item externally. If more than one extension associated with a given extension point modify the next extension point to be executed, the last extension to execute determines the next process to be executed.

It is noted that extensions, while providing flexibility in operation, also may create a significant negative impact on performance of the pricing engine. In some embodiments, in order to ensure timely price calculations, strict guardrails may be applied to extensions written in Apex to limit operation of the extensions. For example, the following is a non-exhaustive list of types of guardrails that may be applied to extensions written in Apex:

Execution time (i.e. wall clock time)
CPU time
Heap space consumed
The ability to read/write to the database
The ability to make external callouts In the event that any of the applied guardrails are violated during execution of one or more extensions at a given extension point, the error condition will be logged, noted in the audit trail, and bubbled back through the API as an execution exception.

In some embodiments, the pricing engine allows more than one pricing engine extension to be applied at a given extension point. Each implementation of the ExtensionPoint interface will specify a relative numeric ordering value for extensions applied to a single extension point. If more than one extension associated with a given extension point specify the same execution order value, all extensions will be executed, but the execution order of those extensions is undefined.

Figure 4:
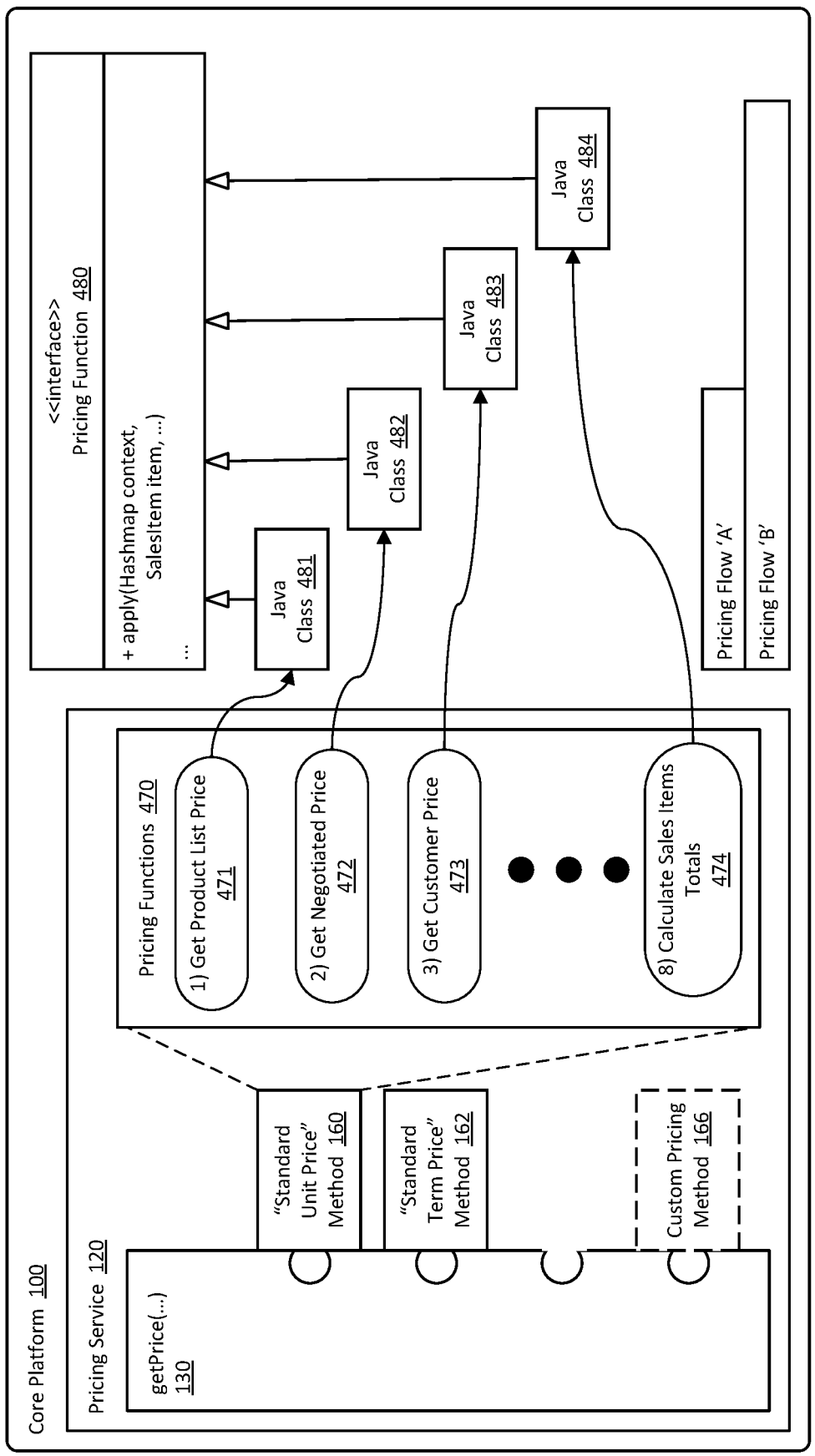
FIG. 4 is an illustration of one embodiment of a computing platform including a standard pricing method for a pluggable pricing architecture.

FIG. 4 is an illustration of one embodiment of a computing platform including a standard pricing method for a pluggable pricing architecture. As illustrated, the core computing platform 100 includes pricing service 120, with the pricing service 120 including the getPrice function 130. The pricing methods to be plugged into the pluggable pricing architecture are a Standard Unit Price method 160, a Standard Term Price method 162, and a custom pricing method 166.

As illustrated in FIG. 4, the Standard Unit Price method 160 includes multiple pricing functions that performed as required in response to a pricing request. In this particular example, the Standard Unit Price method 160 includes the standard pricing functions: Get Produce List Price 471 represented by Java Class 481, Get Negotiated Price 472 represented by Java Class 482, Get Customer Price 473 represented by Java Class 483, and continuing through Calculate Sales Items Totals 474 represented by Java Class 484. In some embodiments, each of the Java classes 481-484 representing the standard pricing functions 471-474 are associated with a pricing function interface 480.

As further depicted in FIG. 4, the Standard Unit Price method 160 is comprised of an ordered sequence of logical processes that together complete the price calculation for a given sales item, with each logical process within the pricing method comprising a pricing function. In some embodiments, the pricing method is defined as metadata that declares the globally unique name of the pricing method, a set of specific set of pricing functions, the execution order of those pricing functions, and whether or not each function is applicable within the context of a specified Pricing Flow. For example, the FIG. 4 further illustrates a Pricing Flow A and a Pricing Flow B, each of which define a particular set of the pricing functions as being applicable in the pricing flow.

FIG. 4 illustrates a particular standard pricing method composed of standard pricing functions. In some embodiments, a pricing service also supports one or most custom pricing methods, which may allow for functions including client specific pricing.

Figure 5:
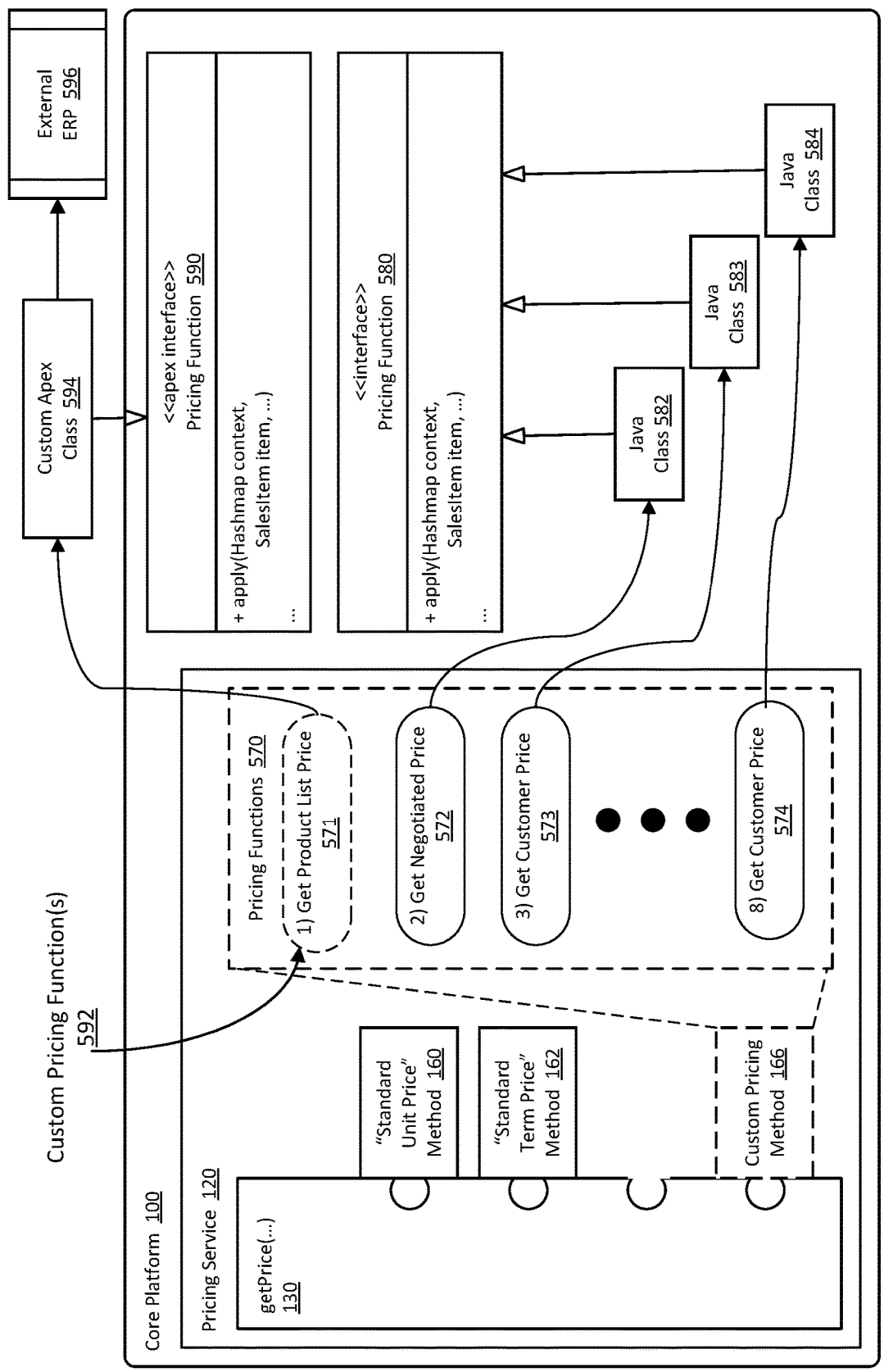
FIG. 5 is an illustration of one embodiment of a computing platform including a custom pricing method for a pluggable pricing architecture.

FIG. 5 is an illustration of one embodiment of a computing platform including a custom pricing method for a pluggable pricing architecture. As illustrated, the core computing platform 100 includes pricing service 120, with the pricing service 120 including the getPrice function 130. The pricing methods to be plugged into the pluggable pricing architecture are a Standard Unit Price method 160, a Standard Term Price method 162, and a custom pricing method 166. FIG. 5 specifically depicts a custom pricing method that leverages a single custom pricing function. However, embodiments are possible, in which any number of custom pricing functions may be utilized in a custom pricing method.

As illustrated in FIG. 5, the custom pricing method 166 includes multiple pricing functions that performed as required in response to a pricing request. In this particular example, the custom pricing method 160 includes a mixture of custom and standard pricing functions, and specifically one or more custom pricing functions 592 including a Get Product List Price 571, which is represented by a custom Apex class 594 to draw from an external ERP (Enterprise Resource Planning) system, thus allowing the client to utilize client-specific pricing data while operating within the pricing service 120. In this example, the custom pricing function 571 is followed by standard functions: Get Negotiated Price 572 represented by Java Class 582, Get Customer Price 573 represented by Java Class 583, and continuing through Calculate Sales Items Totals 574 represented by Java Class 584. In some embodiments, the custom Apex class 594 for the custom pricing function is associated with pricing function Apex interface 590, while each of the Java classes 582-584 representing the standard pricing functions 572-574 are associated with a pricing function interface 580.

Figure 6A:
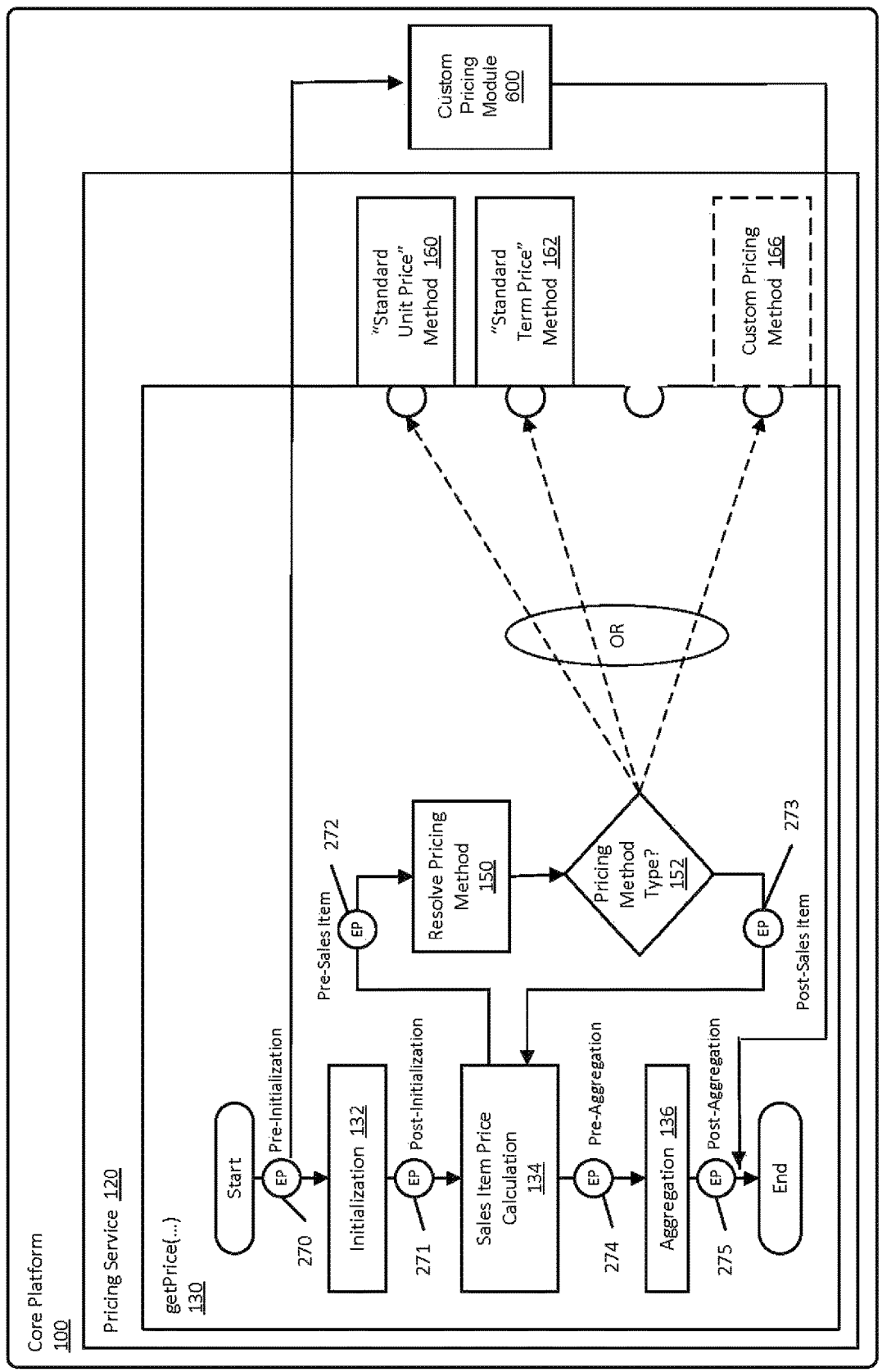
FIG. 6A is an illustration of one embodiment of a computing platform including a custom pricing method for a pluggable pricing architecture.

FIG. 6A is an illustration of one embodiment of a computing platform including a custom pricing method for a pluggable pricing architecture. In the example of FIG. 6A extension points are utilized to bypass the functionality of getPrice function 130 and utilize external pricing module(s). The example of FIG. 6A is a more extreme example of extension point utilization. More complex examples are provided in subsequent figures.

The example of FIG. 6A can be one in which a user of core platform 100 has developed their own complex pricing structure before utilizing core platform 100. For example, a manufacturer of complex product that can be highly customized (e.g., a commercial airplane, manufacturing equipment, a construction project) may have developed a highly complex pricing system (e.g., 600) prior to utilizing core platform 100. Use of extension points allow integration of the previously developed pricing system with the modular pricing engine described herein.

In the example of FIG. 6A, pre-initialization EP 270 could be used to call custom price module 600 that can reside outside of pricing service 120. In one embodiment, custom pricing module 600 can reside on core platform 120 (as illustrated in FIG. 6A). In other embodiments, custom pricing module 600 can reside outside of core platform 120, for example, on a customer platform or other pricing service (not illustrated in FIG. 6A).

In one embodiment, when getPrice function 130 is called, execution begins with pre-initialization EP 270 that exists in the flow of getPrice function 130 before initialization 132. Thus, the operational flow of pricing service 120 is a call to getPrice function 130 and then to custom pricing module 600 prior to initialization of getPrice function 130.

Custom pricing module 600 can operate on data passed to it (e.g., items to be priced, quantities) from getPrice function 130 and perform the relevant pricing operations. The results from custom pricing module 600 can then be passed back to getPrice function 130 via post-aggregation EP 275. The example of FIG. 6A includes only one external pricing module; however, any number of external modules can be utilized. Thus, the example of FIG. 6A provided an effective bypassing of the pluggable pricing modules discussed above. However, the configuration of FIG. 6A allows an entity to utilize pricing service 120 and getPrice 130 function. This can be useful, for example, when an entity wishes to use core platform 100 for other business purposes. As another example, the configuration of FIG. 6A can be used for a subset of pricing operations performed by an entity and the remainder can utilize the full functionality of getPrice module 130 as discussed above.

Figure 6B:
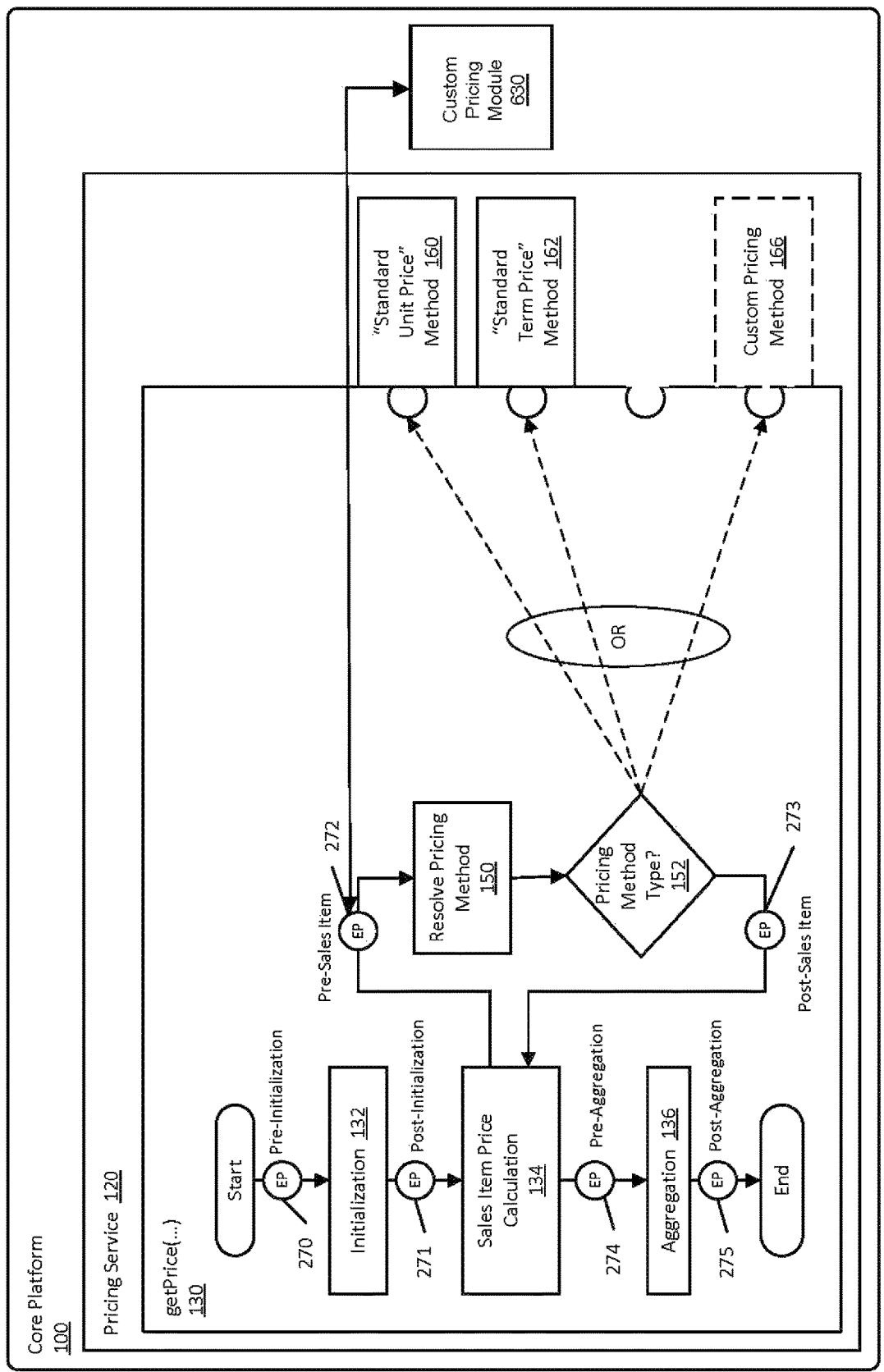
FIG. 6B is an illustration of one embodiment of a computing platform including a custom pricing method for a pluggable pricing architecture.

FIG. 6B is an illustration of one embodiment of a computing platform including a custom pricing method for a pluggable pricing architecture. In the example of FIG. 6B extension points are utilized to augment the functionality of getPrice function 130 with an external pricing module(s). Additional examples are provided in subsequent figures.

The example of FIG. 6B can be one in which a user of core platform 100 has developed their own complex pricing structure before utilizing core platform 100. For example, a manufacturer of complex product that can be highly customized (e.g., a commercial airplane, manufacturing equipment, a construction project) may have developed a highly complex pricing system (e.g., 630) prior to utilizing core platform 100. Use of extension points allow integration of the previously developed pricing system with the modular pricing engine described herein.

In the example of FIG. 6B, the operational flow of getPrice function 130 occurs as discussed above until pre-sales item EP 272, which can be used to call custom pricing module 630 that can reside outside of pricing service 120. In one embodiment, custom pricing module 630 can reside on core platform 120 (as illustrated in FIG. 6B). In other embodiments, custom pricing module 630 can reside outside of core platform 120, for example, on a customer platform or other pricing service (not illustrated in FIG. 6B).

In one embodiment, when getPrice function 130 is called, execution begins initialization 132 then sales item price calculation 134, which would move to resolve pricing method 150 in the default configuration. In the example of FIG. 6B, the operational flow of getPrice function 130 is to custom pricing module 630 through pre-sales item EP 272. Thus, in the example of FIG. 6B, the functionality of custom pricing module 630 occurs in the operational flow of getPrice function 130 prior to resolve pricing method 150.

Custom pricing module 600 can operate on data passed to it (e.g., items to be priced, quantities) from getPrice function 130 and perform the relevant pricing operations. The results from custom pricing module 600 can then be passed back to getPrice function 130 via pre-sales item EP 272. The example of FIG. 6B includes only one external pricing module; however, any number of external modules can be utilized. Thus, the example of FIG. 6B provides an effective augmentation of the pluggable pricing modules discussed above by adding custom pricing module 630 to sales price calculation 134.

This can be useful, for example, when an entity wishes to use core platform 100 for other business purposes. As another example, the configuration of FIG. 6A can be used for a subset of pricing operations performed by an entity and the remainder can utilize the full functionality of getPrice module 130 as discussed above.

Figure 6C:
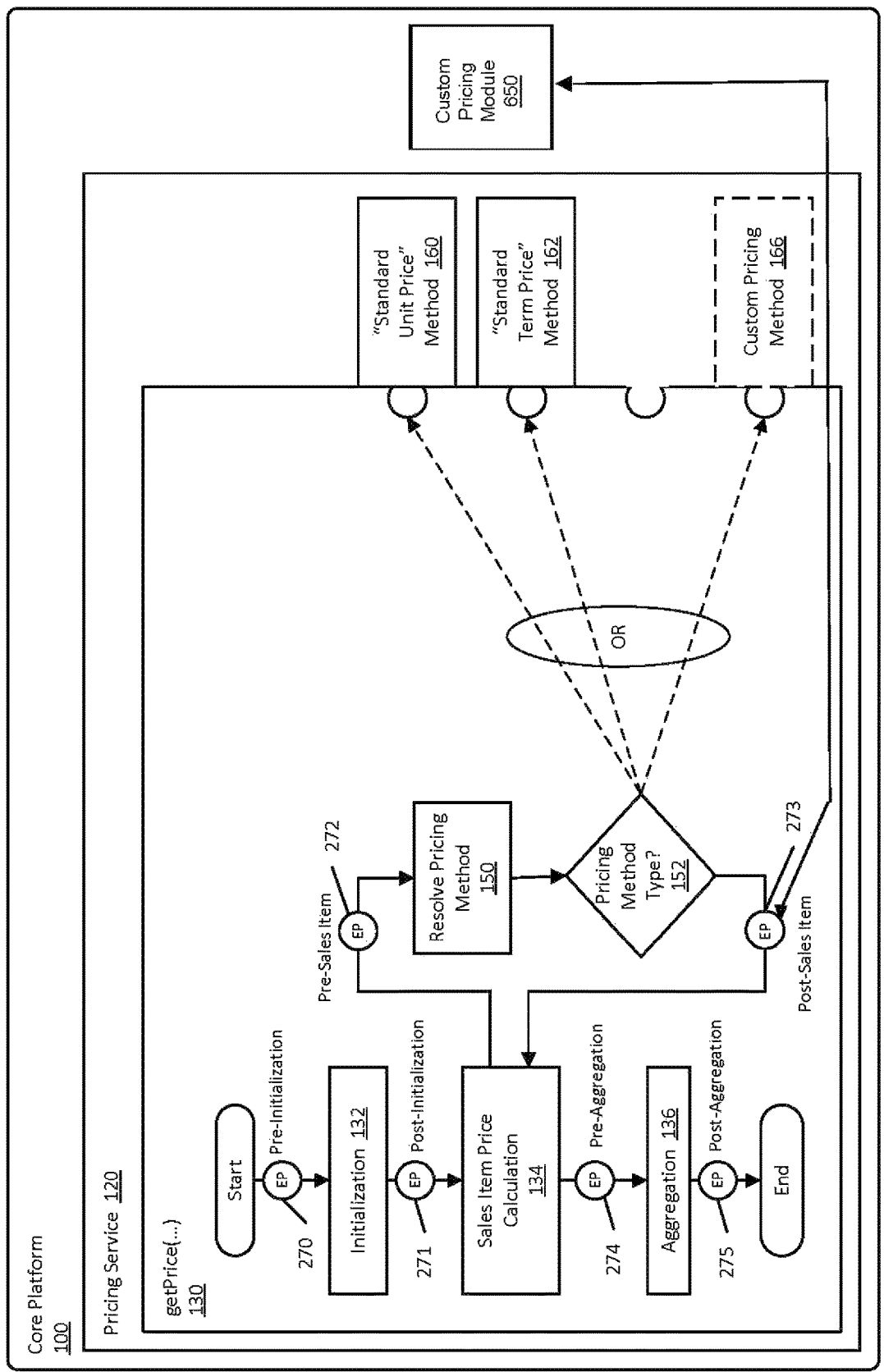
FIG. 6C is an illustration of one embodiment of a computing platform including a custom pricing method for a pluggable pricing architecture.

FIG. 6C is an illustration of one embodiment of a computing platform including a custom pricing method for a pluggable pricing architecture. In the example of FIG. 6C extension points are utilized to augment the functionality of getPrice function 130 with an external pricing module(s). Additional examples are provided in subsequent figures.

The example of FIG. 6C can be one in which a user of core platform 100 has developed their own complex pricing structure before utilizing core platform 100. For example, a manufacturer of complex product that can be highly customized (e.g., a commercial airplane, manufacturing equipment, a construction project) may have developed a highly complex pricing system (e.g., 650) prior to utilizing core platform 100. Use of extension points allow integration of the previously developed pricing system with the modular pricing engine described herein.

In the example of FIG. 6C, the operational flow of getPrice function 130 occurs as discussed above until post-sales item EP 273, which can be used to call custom pricing module 650 that can reside outside of pricing service 120. In one embodiment, custom pricing module 650 can reside on core platform 120 (as illustrated in FIG. 6C). In other embodiments, custom pricing module 650 can reside outside of core platform 120, for example, on a customer platform or other pricing service (not illustrated in FIG. 6C).

In one embodiment, when getPrice function 130 is called, execution begins initialization 132 then sales item price calculation 134, which would move to resolve pricing method 150 in the default configuration to utilize one of the pluggable pricing methods (e.g., 160, 162, 166). In the example of FIG. 6C, the operational flow of getPrice function 130 is to custom pricing module 630 through post-sales item EP 273. Thus, in the example of FIG. 6C, the functionality of custom pricing module 650 occurs in the operational flow of getPrice function 130 after the default/custom price methods utilized by the pluggable architecture.

Custom pricing module 650 can operate on data passed to it (e.g., items to be priced, quantities) from getPrice function 130 and perform the relevant pricing operations. The results from custom pricing module 650 can then be passed back to getPrice function 130 via post-sales item EP 272. The example of FIG. 6C includes only one external pricing module; however, any number of external modules can be utilized. Thus, the example of FIG. 6C provides an effective augmentation of the pluggable pricing modules discussed above by adding custom pricing module 650 to sales price calculation 134.

Figure 7A:
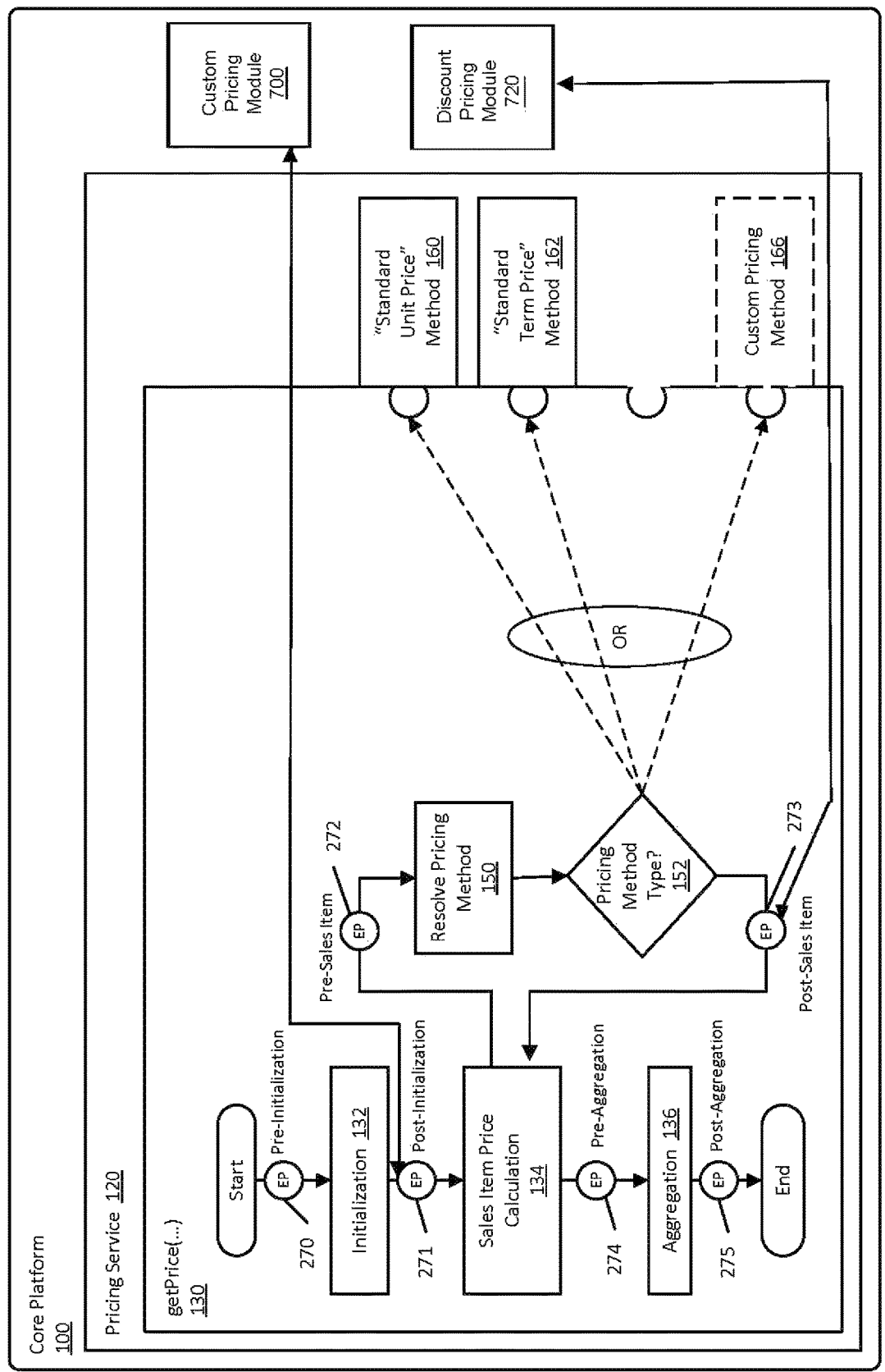
FIG. 7A is an illustration of one embodiment of a computing platform including multiple custom pricing modules for a pluggable pricing architecture.

FIG. 7A is an illustration of one embodiment of a computing platform including multiple custom pricing modules for a pluggable pricing architecture. In the example of FIG. 7A multiple extension points are utilized to augment the functionality of getPrice function 130 and utilize external pricing modules.

In the example of FIG. 7A, post-initialization EP 271 could be used to call custom pricing module 700 that can reside outside of pricing service 120. In one embodiment, custom pricing module 700 can reside on core platform 120 (as illustrated in FIG. 7A). In other embodiments, custom pricing module 700 can reside outside of core platform 120, for example, on a customer platform or other pricing service (not illustrated in FIG. 7A).

Similarly, post-sales item EP 273 could be used to call discount pricing module 720 that can reside outside of pricing service 120. In one embodiment, discount pricing module 720 can reside on core platform 120 (as illustrated in FIG. 7A). In other embodiments, discount pricing module 720 can reside outside of core platform 120, for example, on a customer platform or other pricing service (not illustrated in FIG. 7A).

In one embodiment, when getPrice function 130 is called, execution begins with pre-initialization 132 and custom pricing module 700 can be called via post initialization EP 271 that exists in the flow of getPrice function 130 after initialization 132. Thus, the operational flow of pricing service 120 is a call to getPrice function 130 and then to custom pricing module 700 after to initialization of getPrice function 130. Custom pricing module 700 can operate on data passed to it (e.g., items to be priced, quantities) from getPrice function 130 and perform the relevant pricing operations. The results from custom pricing module 700 can then be passed back to getPrice function 130 via post-initialization EP 271.

The operational flow can then continue through sales item price calculation 134, resolve pricing method 152 and pricing method type 152 as discussed above. After pricing operations based on a pluggable pricing method (e.g., 160, 162, 166), another custom pricing module (e.g., discount pricing module 720) can be utilized through post-sales item EP 273. Thus, custom pricing module can be provided within the main flow of getPrice function 130 as well as within the pricing calculation flow.

Figure 7B:
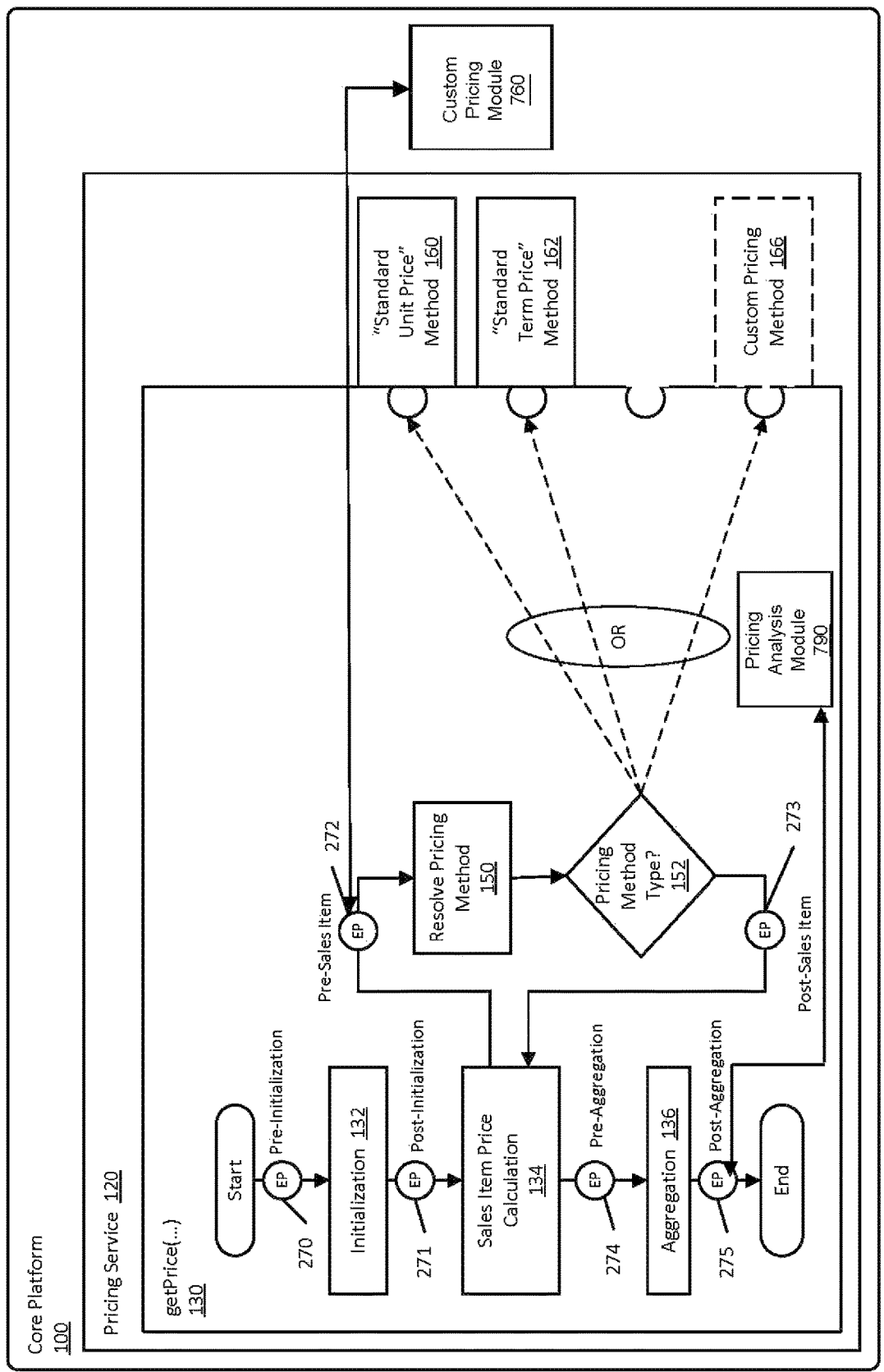
FIG. 7B is an illustration of one embodiment of a computing platform including multiple custom pricing modules for a pluggable pricing architecture.

FIG. 7B is an illustration of one embodiment of a computing platform including multiple custom pricing modules for a pluggable pricing architecture. In the example of FIG. 7B multiple extension points are utilized to augment the functionality of getPrice function 130 and utilize external pricing modules.

In the example of FIG. 7B, pre-sales item EP 272 could be used to call custom pricing module 760 that can reside outside of pricing service 120. In one embodiment, custom pricing module 760 can reside on core platform 120 (as illustrated in FIG. 7B). In other embodiments, custom pricing module 760 can reside outside of core platform 120, for example, on a customer platform or other pricing service (not illustrated in FIG. 7B).

Similarly, post-aggregation EP 275 could be used to call pricing analysis module 790 that can reside outside of pricing service 120. In one embodiment, pricing analysis module 790 can reside on core platform 120 (as illustrated in FIG. 7B). In other embodiments, pricing analysis module 790 can reside outside of core platform 120, for example, on a customer platform or other pricing service (not illustrated in FIG. 7B).

In one embodiment, when getPrice function 130 is called, execution begins with pre-initialization 132 and sales item price calculation 134, and custom pricing module 760 can be called via pre-sales EP 272 that exists in the flow of getPrice function 130. Thus, the operational flow of pricing service 120 is a call to getPrice function 130 and then to custom pricing module 760 from within sales item price calculation 134. Custom pricing module 760 can operate on data passed to it (e.g., items to be priced, quantities) from getPrice function 130 and perform the relevant pricing operations. The results from custom pricing module 760 can then be passed back to getPrice function 130 via pre-sales item EP 272.

The operational flow can then continue through sales item price calculation 134, resolve pricing method 152 and pricing method type 152 as discussed above. After pricing operations based on a pluggable pricing method (e.g., 160, 162, 166) and aggregation 136, another custom pricing module (e.g., pricing analysis module 790) can be utilized through post-aggregation EP 275. Thus, custom pricing modules can be provided within the main flow of getPrice function 130 as well as within the pricing calculation flow.

Figure 8:
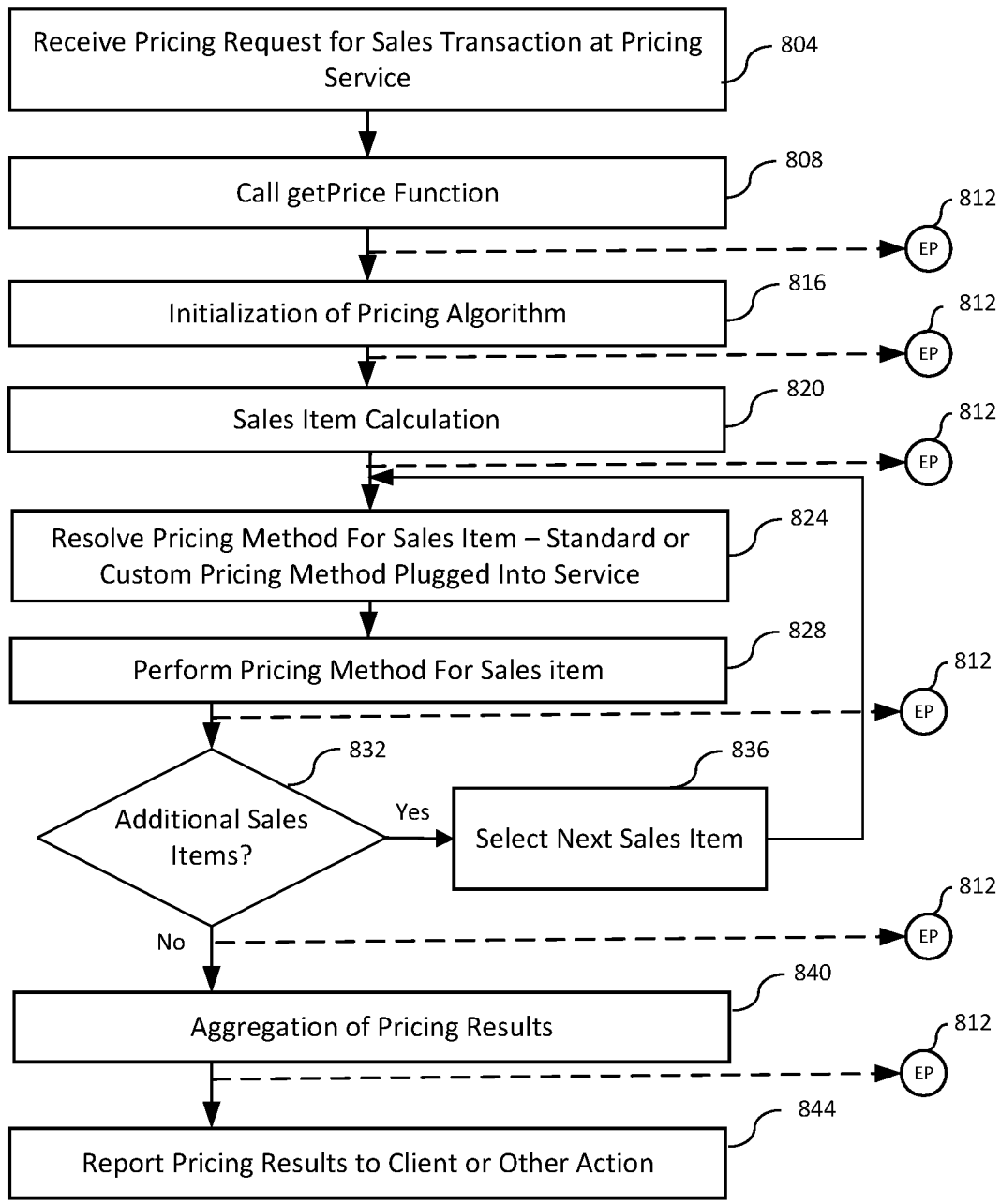
FIG. 8 is a flowchart of one embodiment to illustrate a process for pricing utilizing a pricing service.

FIG. 8 is a flowchart of one embodiment to illustrate a process for pricing utilizing a pricing service. In some embodiments, a process includes receiving a pricing request for a pricing transaction at a pricing service 804, wherein the pricing service may be pricing service 120 within core platform 100 as illustrated in FIGS. 1, 2, 4, and 5. A get price function is called 808 to perform pricing for the one or more sales items in the pricing transaction, such as getPrice 130 as illustrated in FIGS. 1, 2, 4, and 5. It is noted that the execution of the process may include the following of one or more extensions provided at one or more extension points (EP) 812. The extension points 812 may include for example the extension points illustrated in FIG. 2.

The process may continue with initialization of the pricing algorithm 816, and sales price calculation for each sales item in the pricing transaction 820. Commencing with a first sales item, a pricing method is resolved for the pricing method 824, wherein the pricing method may either a standard pricing method or a custom pricing method, as illustrated in FIGS. 4 and 5, provided as plug in for the pricing service. The pricing method is then performed for the sales item 828. If there are additional sales items to be processed in the sales transaction 832, a next sales item is selected 836, and the process returns to resolving the appropriate pricing method for the sales item 824 and performing the pricing method for the sales item 828.

When there are no further sales items for processing in the sales transaction, the process may proceed to aggregation of the pricing results 840 and reporting of the aggregated pricing results to the client or other action relating to the aggregated pricing results 844.

The examples illustrating the use of technology disclosed herein should not be taken as limiting or preferred. The examples are intended to sufficiently illustrate the technology disclosed without being overly complicated and are not intended to illustrate all of the technologies disclosed. A person having ordinary skill in the art will appreciate that there are many potential applications for one or more implementations of this disclosure and hence, the implementations disclosed herein are not intended to limit this disclosure in any fashion.

One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Other implementations may include a non-transitory computer readable storage medium storing instructions executable by a processor to perform a method as described above. Yet another implementation may include a system including memory and one or more processors operable to execute instructions, stored in the memory, to perform a method as described above.

In some embodiments, one or more non-transitory computer-readable storage mediums having stored thereon executable computer program instructions that, when executed by one or more processors, cause the one or more processors to perform operations including installing a plurality of pricing methods at a pricing service, the pricing service including a pluggable architecture to accept the plurality of pricing methods, each pricing method of the plurality of pricing method including a set of pricing functions; receiving at the pricing service a pricing request from a first client for a sales transaction including one or more sales items, the pricing request including a pricing context for each of the one or more sales items; and performing a price calculation for the sales transaction, including resolving a pricing method for each sales item of the one or more sales items from the plurality of pricing methods, applying the set of pricing functions for the resolved pricing method for each sales item, wherein the application of the set of pricing functions is based at least in part on the pricing context for the sales item, calculating a price for each sales item based upon an outcome of the set of pricing functions, and aggregating the calculated prices for each of the one or more sales items.

In some embodiments, a system includes. one or more processors for processing of data; an application programming interface (API) to receive pricing requests from one or more clients; and a pricing service, the pricing service including a pluggable architecture for installation of a plurality of pricing methods at a pricing service, each pricing method of the plurality of pricing method including a set of pricing functions, wherein, in response to receiving a pricing requests for a sales transaction from a first client, the sales transaction including one or more sales items and including a pricing context for each of the one or more sales items, the system is to perform a price calculation for each of the one or more sales items, including the system to resolve a pricing method for each sales item from the plurality of pricing methods, apply the set of pricing functions for the resolved pricing function for each sales item, wherein the application of the set of pricing functions is based at least in part on the pricing context for the sales item, calculate a price for each sales item based upon an outcome of the set of pricing functions, and aggregate the calculated prices for each of the one or more sales items.

In some embodiments, a method includes installing a plurality of pricing methods at a pricing service, the pricing service including a pluggable architecture to accept the plurality of pricing methods, each pricing method of the plurality of pricing method including a set of pricing functions; receiving at the pricing service a pricing request from a first client for a sales transaction including one or more sales items, the pricing request including a pricing context for each of the one or more sales items; resolving a pricing method for each sales item of the one or more sales items from the plurality of pricing methods; applying the set of pricing functions for the resolved pricing method for each sales item of the one or more sales items, wherein the application of the set of pricing functions is based at least in part on the pricing context for the sales item; calculating a price for each sales item based upon an outcome of the set of pricing functions for the resolved pricing method; and aggregating the calculated prices for each of the one or more sales items.

Figure 9:
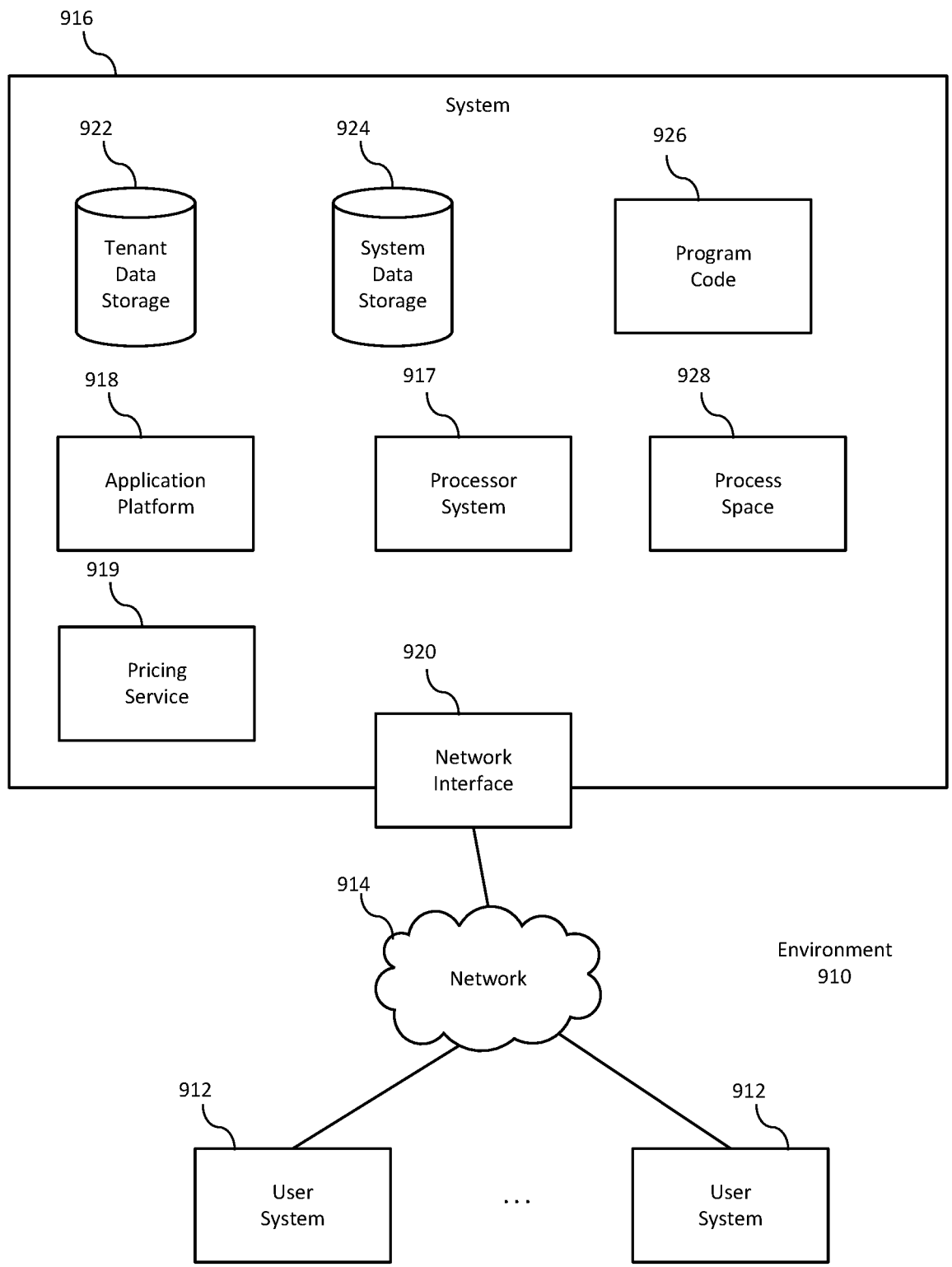
FIG. 9 is a block diagram of one embodiment of an environment in which a pluggable architecture for performance of pricing operations may be implemented.

FIG. 9 illustrates a block diagram of an environment in which a pluggable architecture for performance of pricing operations may be implemented according to some embodiments. In some embodiments, the environment 910 includes a pluggable architecture for performance of pricing operations, such as illustrated in FIGS. 1-8, including a pricing service 919, such as pricing service 120 illustrated in FIGS. 1, 2, 4, and 5. The environment 910 may include user systems 912, network 914, system 916, processor system 917, application platform 918, network interface 920, tenant data storage 922, system data storage 924, program code 926, and process space 928. In other embodiments, environment 910 may not have all of the components listed and/or may have other elements instead of, or in addition to, those listed above.

Environment 910 is an environment in which an on-demand database service exists. User system 912 may be any machine or system that is used by a user to access a database user system. For example, any of user systems 912 can be a handheld computing device, a smart phone, a laptop or tablet computer, a work station, and/or a network of computing devices. As illustrated in herein FIG. 9 and in more detail in FIG. 9, user systems 912 may interact via a network 914 with an on-demand database service, such as system 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" may be used interchangeably herein. A database image may include one or more database objects. A relational database management system (RDMS) or the equivalent may execute storage and retrieval of information against the database object(s). Application platform 918 may be a framework that allows the applications of system 916 to run, such as the hardware and/or software, e.g., the operating system. In an embodiment, on-demand database service 916 may include an application platform 918 that enables creation, managing and executing one or more applications developed by the provider of the on-demand database service, users accessing the on-demand database service via user systems 912, or third-party application developers accessing the on-demand database service via user systems 912.

The users of user systems 912 may differ in their respective capacities, and the capacity of a particular user system 912 might be entirely determined by permissions (permission levels) for the current user. For example, where a salesperson is using a particular user system 912 to interact with system 916, that user system has the capacities allotted to that salesperson. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some implementations, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 916, shown in FIG. 9, implements a web-based customer relationship management (CRM) system. For example, in one embodiment, system 916 includes application servers configured to implement and execute CRM software applications as well as provide related data, code, forms, webpages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications, including a CRM application. User (or third-party developer) applications, which may or may not include CRM, may be supported by the application platform 918, which manages creation, storage of the applications into one or more database objects and executing of the applications in a virtual machine in the process space of the system 916.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

Several elements in the system shown in FIG. 9 include conventional, well-known elements that are explained only briefly here. For example, each user system 912 could include a desktop personal computer, workstation, laptop or tablet computer, smart phone, or any wireless access protocol (WAP) enabled device or any other computing device capable of interfacing directly or indirectly to the Internet or other network connection. User system 912 typically runs an HTTP client, e.g., a browsing program (also referred to as a web browser or browser), such as Edge or Internet Explorer from Microsoft, Safari from Apple, Chrome from Google, Firefox from Mozilla, or a WAP-enabled browser in the case of a smart phone or other wireless device, or the like, allowing a user (e.g., subscriber of the multi-tenant database system) of user system 912 to access, process and view information, pages and applications available to it from system 916 over network 914. Each user system 912 also typically includes one or more user interface devices, such as a keyboard, a mouse, touch pad, touch screen, pen, voice interface, gesture recognition interface, or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 912 and all of its components are operator configurable using applications, such as a browser, including computer code run using a central processing unit such as an Intel Core series processor or the like. Similarly, system 916 (and additional instances of an MTS, where more than one is present) and all of their components might be operator configurable using application(s) including computer code to run using a central processing unit such as processor system 917, which may include an Intel Core series processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 916 to intercommunicate and to process webpages, applications and other data and media content as described herein are preferably downloaded and stored on a hard disk or solid state drive (SSD), but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun Microsystems, Inc.).

According to one embodiment, each system 916 is configured to provide webpages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 10:
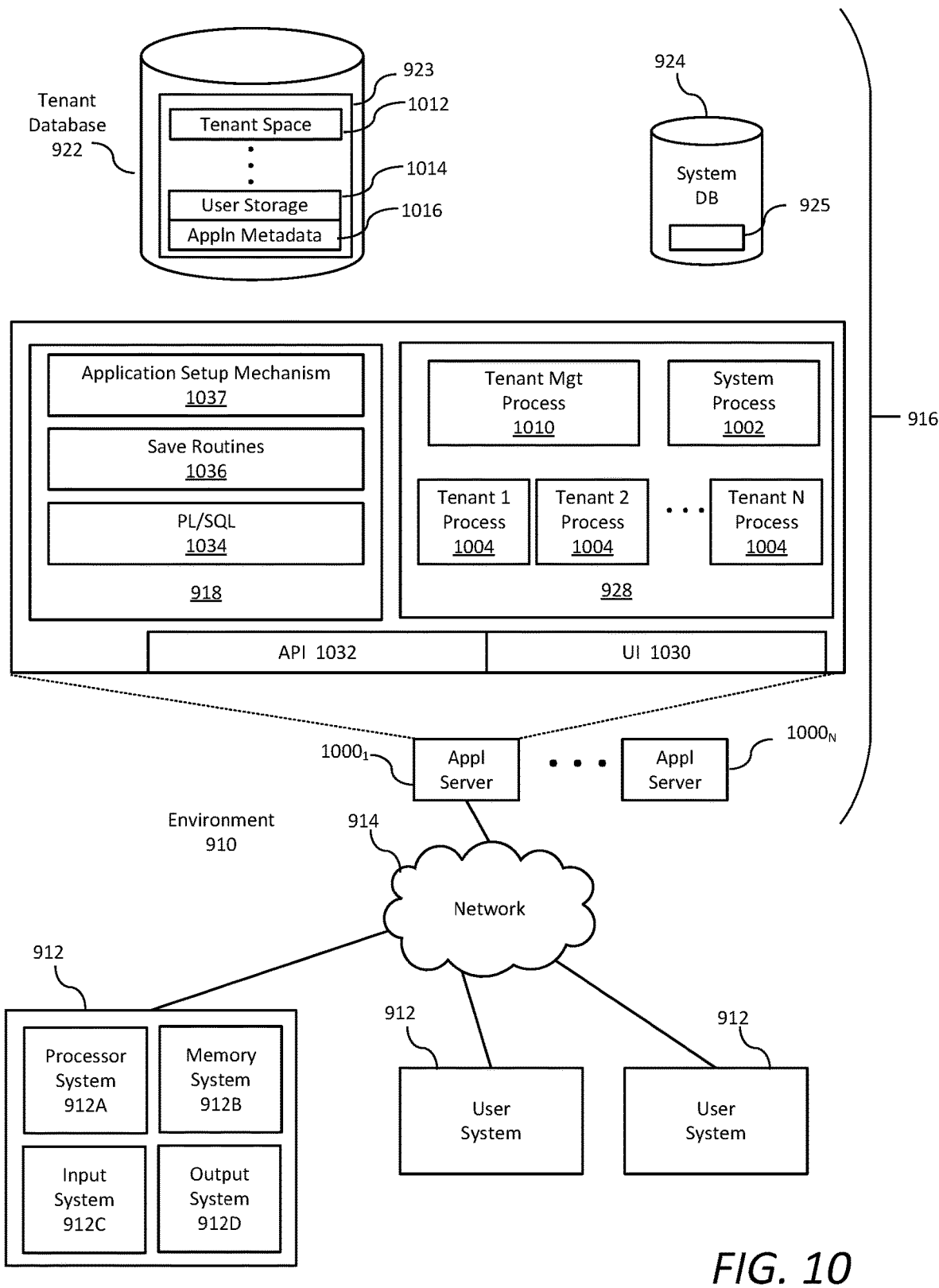
FIG. 10 illustrates further details of one embodiment of an environment in which a pluggable architecture for performance of pricing operations may be implemented.

FIG. 10 illustrates further details of an environment in which a pluggable architecture for performance of pricing operations may be implemented according to some embodiments. FIG. 10 provides further detail regarding elements of system 916. In addition, various interconnections in an embodiment are provided. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers 1000₁-1000_N, system process space 1002, tenant process spaces 1004, tenant management process space 1010, tenant storage area 1012, user storage 1014, and application metadata 1016. In other embodiments, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of one or more processors. Memory system 912B may be any combination of one or more memory devices, short term, and/or long-term memory. Input system 912C may be any combination of input devices, such as one or more keyboards, mice, trackballs, scanners, cameras, and/or interfaces to networks. Output system 912D may be any combination of output devices, such as one or more monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as one or more Oracle™ databases.

Application platform 918 includes an application setup mechanism 1038 that supports application developers' creation and management of applications, which may be saved as metadata into tenant data storage 922 by save routines 1036 for execution by subscribers as one or more tenant process spaces 1004 managed by tenant management process 1010 for example. Invocations to such applications may be coded using PL/SOQL 1034 that provides a programming language style interface extension to API 1032. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server 1000₁ might be coupled via the network 914 (e.g., the Internet), another application server 1000_{N-1} might be coupled via a direct network link, and another application server 1000_N might be coupled by yet a different network connection. Transfer Control Protocol and Internet Protocol (TCP/IP) are typical protocols for communicating between application servers 1000 and the database system. However, it will be apparent to one skilled in the art that other transport protocols may be used to optimize the system depending on the network interconnect used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In one embodiment, therefore, an interface system implementing a load balancing function (e.g., an F5 BIG-IP load balancer) is communicably coupled between the application servers 1000 and the user systems 912 to distribute requests to the application servers 1000. In one embodiment, the load balancer uses a least connections algorithm to route user requests to the application servers 1000. Other examples of load balancing algorithms, such as round robin and observed response time, also can be used. For example, in certain embodiments, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each salesperson uses system 916 to manage their sales process. Thus, a user might maintain contact data, leads data, customer follow-up data, performance data, goals and progress data, etc., all applicable to that user's personal sales process (e.g., in tenant data storage 922). In an example of an MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., one or more SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, with U.S. Pat. No. 7,779,039, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Embodiments may be provided, for example, as a computer program product which may include one or more machine-readable media (including a non-transitory machine-readable or computer-readable storage medium) having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic tape, magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

While concepts been described in terms of several embodiments, those skilled in the art will recognize that embodiments not limited to the embodiments described but can be practiced with modification and alteration within the spirit and scope of the appended claims. The description is thus to be regarded as illustrative instead of limiting.

What is claimed is:

1. One or more non-transitory computer-readable storage mediums having stored thereon executable computer program instructions that, when executed by one or more processors, are configurable to cause the one or more processors to perform operations comprising:
   implementing a pricing service, at a server, as a pluggable architecture, the pluggable architecture excluding, and having no knowledge regarding, pricing constructs that define various pricing algorithms;
   installing a plurality of pricing methods as plugins into the pluggable architecture of the pricing service, each pricing method of the plurality of pricing methods including a set of pricing functions, and the pricing service further including one or more extension points comprising programmatic hooks within an operational flow of the pricing service to provide optional interfaces to functional modules external to the pricing service, wherein the pricing methods are installed such that clients can modify or customize individual pricing methods in the plurality of pricing methods without having to modify the pluggable architecture itself;
   receiving, at the pricing service, a pricing request from a first client for a sales transaction including one or more sales items, the pricing request including a pricing context for each of the one or more sales items; and
   performing a price calculation for the sales transaction, including:
      resolving selected pricing method for each sales item of the one or more sales items from the plurality of pricing methods,
      calling, via at least one of the one or more extension points, an external functional module to interact with the operational flow of the pricing service,
      providing, with the pricing service, the aggregated results to the first client.

2. The one or more storage mediums of claim 1, wherein the plurality of pricing methods includes:
   one or more standard pricing methods for use by multiple clients of a host service platform; and
   one or more custom pricing methods for the first client that are to be used by the pricing service for operational flows associated with the first client.

3. The one or more storage mediums of claim 2, wherein each pricing function of a set of pricing functions of a pricing method defines a single process within the pricing method.

4. The one or more storage mediums of claim 3, wherein each pricing function is defined in code.

5. The one or more storage mediums of claim 4, wherein the pricing functions of the one or more standard pricing methods are coded in a first format and the pricing functions of the one or more custom pricing functions are coded in a second format.

6. The one or more storage mediums of claim 1, wherein the external module comprises at least one functional module residing on a host service platform for the pricing service, and at least one functional module that is external to the host service platform.

7. The one or more storage mediums of claim 6, wherein the instructions further include instructions for applying one or more guardrails to limit operation of the one or more extensions.

8. The one or more storage mediums of claim 1, wherein the instructions further include instructions for reporting the aggregated pricing to the first client.

9. A system comprising:
   a processor; and
   memory, the memory storing instructions to cause the processor to execute a method, the method comprising:
      implementing a pricing service, at a server, as a pluggable architecture, the pluggable architecture excluding, and having no knowledge regarding, pricing constructs that define various pricing algorithms;
      installing a plurality of pricing methods as plugins into the pluggable architecture of the pricing service, each pricing method of the plurality of pricing methods including a set of pricing functions, and the pricing service further including one or more extension points comprising programmatic hooks within an operational flow of the pricing service to provide optional interfaces to functional modules external to the pricing service, wherein the pricing methods are installed such that clients can modify or customize individual pricing methods in the plurality of pricing methods without having to modify the pluggable architecture itself;
      receiving, at the pricing service, a pricing request from a first client for a sales transaction including one or more sales items, the pricing request including a pricing context for each of the one or more sales items; and
      performing a price calculation for the sales transaction, including:
         resolving selected pricing method for each sales item of the one or more sales items from the plurality of pricing methods,
         calling, via at least one of the one or more extension points, an external functional module to interact with the operational flow of the pricing service,
         providing, with the pricing service, the aggregated results to the first client.

10. The system of claim 9, wherein the plurality of pricing methods includes:
    one or more standard pricing methods for use by multiple clients;
    one or more custom pricing methods for the first client; and
    at least one functional module external to the pricing service for the first client.

11. The system of claim 10, wherein each pricing function of a set of pricing functions of a pricing method defines a single process within the pricing method.

12. The system of claim 10, wherein each pricing function is defined in code.

13. The system of claim 12, wherein the pricing functions of the one or more standard pricing methods are coded in a first format and the pricing functions of the one or more custom pricing functions are coded in a second format.

14. The system of claim 9, wherein the external module comprises at least one functional module residing on a host service platform for the pricing service, and at least one functional module that is external to the host service platform.

15. The system of claim 10, wherein the pricing service includes one or more guardrails to limit operation of the one or more extensions.

16. A non-transitory computer readable medium storing instructions to cause a processor to execute a method, the method comprising:
 implementing a pricing service, at a server, as a pluggable architecture, the pluggable architecture excluding, and having no knowledge regarding, pricing constructs that define various pricing algorithms;
 installing a plurality of pricing methods as plugins into the pluggable architecture of the pricing service, each pricing method of the plurality of pricing methods including a set of pricing functions, and the pricing service further including one or more extension points comprising programmatic hooks within an operational flow of the pricing service to provide optional interfaces to functional modules external to the pricing service, wherein the pricing methods are installed such that clients can modify or customize individual pricing methods in the plurality of pricing methods without having to modify the pluggable architecture itself;
 receiving, at the pricing service, a pricing request from a first client for a sales transaction including one or more sales items, the pricing request including a pricing context for each of the one or more sales items; and
 performing a price calculation for the sales transaction, including:
  resolving selected pricing method for each sales item of the one or more sales items from the plurality of pricing methods,
  calling, via at least one of the one or more extension points, an external functional module to interact with the operational flow of the pricing service,
 providing, with the pricing service, the aggregated results to the first client.

17. The non-transitory computer readable medium of claim 16, wherein the plurality of pricing methods includes:
 one or more standard pricing methods for use by multiple clients;
 one or more custom pricing methods for the first client; and
 at least one functional module external to the pricing service for the first client.

18. The non-transitory computer readable medium of claim 17, wherein each pricing function of a set of pricing functions of a pricing method defines a single process within the pricing method.

19. The non-transitory computer readable medium of claim 18, wherein each pricing function is defined in code.

20. The non-transitory computer readable medium of claim 19 wherein the pricing functions of the one or more standard pricing methods are coded in a first format and the pricing functions of the one or more custom pricing functions are coded in a second format.

\* \* \* \* \*